United States Patent
Ueyoko

(10) Patent No.: US 9,346,321 B2
(45) Date of Patent: May 24, 2016

(54) REDUCED WEIGHT AIRCRAFT TIRE

(75) Inventor: Kiyoshi Ueyoko, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 907 days.

(21) Appl. No.: 13/085,007

(22) Filed: Apr. 12, 2011

(65) Prior Publication Data

US 2011/0303336 A1     Dec. 15, 2011

Related U.S. Application Data

(60) Provisional application No. 61/353,854, filed on Jun. 11, 2010.

(51) Int. Cl.
| | | |
|---|---|---|
| *B60C 9/18* | (2006.01) | |
| *B60C 9/22* | (2006.01) | |
| *B60C 9/26* | (2006.01) | |

(52) U.S. Cl.
CPC .............. *B60C 9/263* (2013.04); *B60C 9/2204* (2013.04); *B60C 2009/209* (2013.04); *B60C 2009/2016* (2013.04); *B60C 2009/2035* (2013.04); *B60C 2009/2077* (2013.04); *B60C 2009/2093* (2013.04); *B60C 2009/266* (2013.04); *B60C 2200/02* (2013.04); *Y10T 152/10765* (2015.01)

(58) Field of Classification Search
USPC .................................................. 152/526–538
IPC ............. B60C 9/18,9/20, 9/22, 9/24, 9/26, 9/28
See application file for complete search history.

(56) References Cited

U.S. PATENT DOCUMENTS

| | | | | |
|---|---|---|---|---|
| 4,201,260 | A | * | 5/1980 | Mirtain et al. ................. 152/531 |
| 5,591,284 | A | * | 1/1997 | Gaudin ........................ 152/532 |
| 6,116,311 | A | * | 9/2000 | Ueyoko et al. ................ 152/531 |
| 6,959,746 | B2 | * | 11/2005 | Shimizu ........................ 152/534 |
| 7,712,499 | B2 | | 5/2010 | Yano et al. .................... 152/527 |
| 7,905,265 | B2 | | 3/2011 | Roget et al. ................... 152/527 |
| 2005/0194081 | A1 | | 9/2005 | Yano et al. .................... 152/527 |
| 2007/0235116 | A1 | | 10/2007 | Roget et al. ................... 152/527 |
| 2008/0105352 | A1 | * | 5/2008 | Ueyoko et al. ................ 152/527 |

FOREIGN PATENT DOCUMENTS

| | | | | | |
|---|---|---|---|---|---|
| EP | 1449680 | A1 | * | 8/2004 | ............... B60C 9/22 |
| JP | 03070603 | A | * | 3/1991 | ............... B60C 9/18 |
| JP | 2009196548 | A | * | 9/2009 | ............... B60C 9/22 |
| WO | 03/061991 | A1 | | 7/2003 | ............... B60C 9/18 |

OTHER PUBLICATIONS

Machine Translation: JP2009-196548; Yoshikawa, Yusuke; No date.*

* cited by examiner

*Primary Examiner* — Michael H Wilson
*Assistant Examiner* — Kendra Ly
(74) *Attorney, Agent, or Firm* — June E. Rickey

(57) ABSTRACT

A pneumatic tire having a carcass and a belt reinforcing structure wherein the belt reinforcing structure is a composite belt structure having at least one radially inner spiral layer and at least one zigzag belt reinforcing structure located radially outward of said spiral layer. The zigzag belt width is preferably narrower than the spiral layer.

4 Claims, 5 Drawing Sheets

US 9,346,321 B2

REDUCED WEIGHT AIRCRAFT TIRE

CROSS REFERENCE TO OTHER APPLICATIONS

This application claims the benefit of and incorporates by reference U.S. Provisional Application No. 61/353,854, filed Jun. 11, 2010.

FIELD OF THE INVENTION

This invention relates to pneumatic tires having a carcass and a belt reinforcing structure, more particularly to high speed heavy load tires such as those used on aircraft.

BACKGROUND OF THE INVENTION

Pneumatic tires for high speed applications experience a high degree of flexure in the crown area of the tire as the tire enters and leaves the area of the footprint. This problem is particularly exacerbated on aircraft tires wherein the tires can reach speed of over 200 mph at takeoff and landing.

When a tire spins at very high speeds the crown area tends to grow in dimension due to the high angular accelerations and velocity, tending to pull the tread area radially outwardly. Counteracting these forces is the load of the vehicle which is only supported in the small area of the tire known as the footprint area.

Current tire design drivers are an aircraft tire capable of high speed, high load and with reduced weight. It is known in the prior art to use zigzag belt layers in aircraft tires, such as disclosed in the Watanabe U.S. Pat. No. 5,427,167. Zigzag belt layers have the advantage of eliminating cut belt edges at the outer lateral edge of the belt package. The inherent flexibility of the zigzag belt layers also help improve cornering forces. However, a tire designed with zigzag belt layers cannot carry as heavy a load as required by current commercial aircraft design requirements. Further, there is generally a tradeoff between load capacity and weight. Thus an improved aircraft tire is needed, which is capable of meeting high speed, high load and with reduced weight.

DEFINITIONS

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Ply" means a continuous layer of rubber-coated parallel cords.

"Radial" and "radially" mean directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Zigzag belt reinforcing structure" means at least two layers of cords or a ribbon of parallel cords having 1 to 20 cords in each ribbon and laid up in an alternating pattern extending at an angle between 5° and 30° between lateral edges of the belt layers.

DETAILED DESCRIPTION OF THE INVENTION

Figure 1:
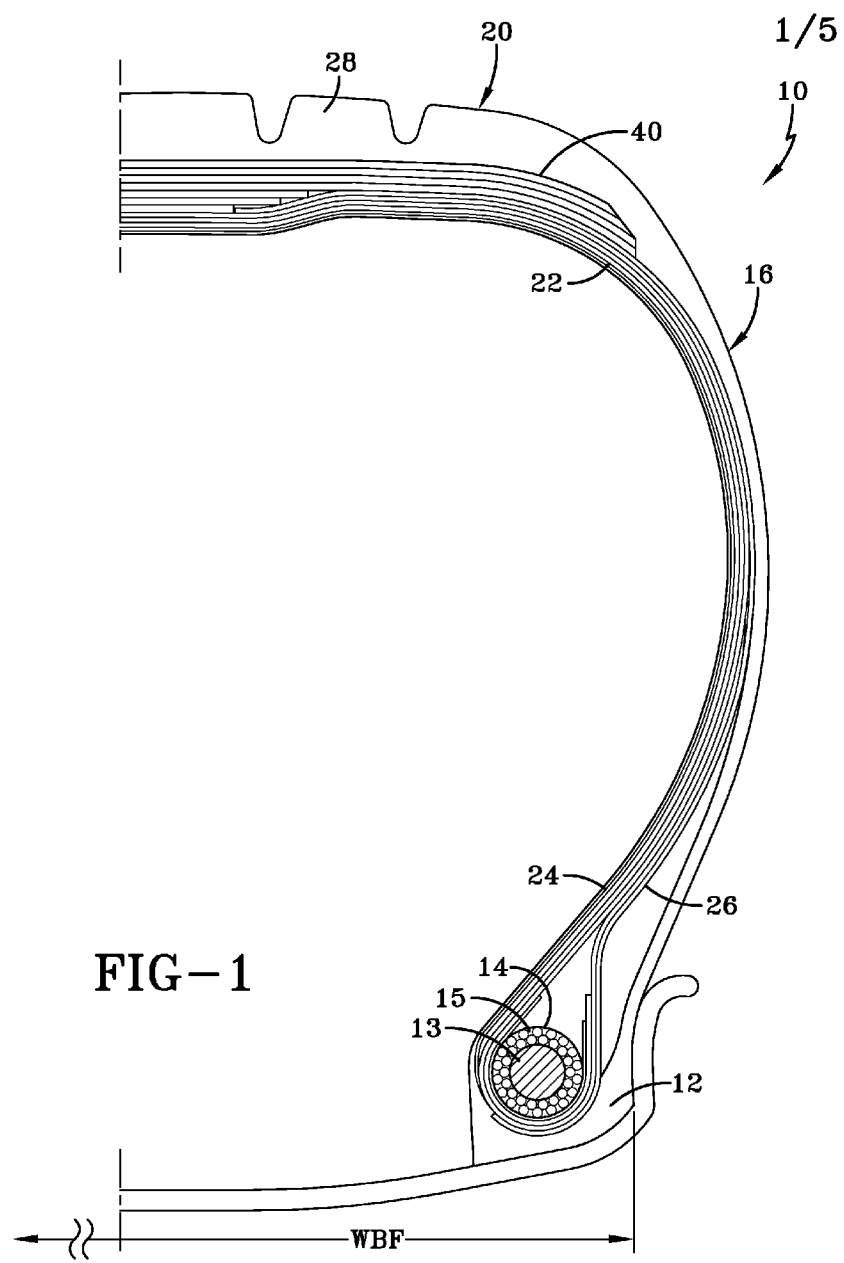
FIG. 1 is a schematic cross-sectional view of a first embodiment of half of a tire according to the invention.

FIG. 1 illustrates a cross-sectional view of one half of a radial aircraft tire 10 of the present invention. The tire is symmetrical about the mid-circumferential plane so that only one half is illustrated. As shown, the aircraft tire comprises a pair of bead portions 12 each containing a bead core 14 embedded therein. One example of a bead core suitable for use in an aircraft tire is shown in U.S. Pat. No. 6,571,847. The bead core 14 preferably has an aluminum, aluminum alloy or other light weight alloy in the center portion 13 surrounded by a plurality of steel sheath wires 15. A person skilled in the art may appreciate that other bead cores may also be utilized.

The aircraft tire further comprises a sidewall portion 16 extending substantially outward from each of the bead portions 12 in the radial direction of the tire, and a tread portion 20 extending between the radially outer ends of the sidewall portions 16. Furthermore, the tire 10 is reinforced with a carcass 22 toroidally extending from one of the bead portions 12 to the other bead portion 12. The carcass 22 is comprised of inner carcass plies 24 and outer carcass plies 26, preferably oriented in the radial direction. Among these carcass plies, typically four inner plies 24 are wound around the bead core 14 from inside of the tire toward outside thereof to form turnup portions, while typically two outer plies 26 are extended downward to the bead core 14 along the outside of the turnup portion of the inner carcass ply 24. Each of these carcass plies 24,26 may comprise any suitable cord, typically nylon cords such as nylon-6,6 cords extending substantially perpendicular to an equatorial plane EP of the tire (i.e. extending in the radial direction of the tire). Preferably the nylon cords have an 1890 denier/2/2 or 1890 denier/3 construction.

One or more of the carcass plies 24, 26 may also comprise an aramid and nylon cord structure, for example, a hybrid cord, a high energy cord or a merged cord. Examples of suitable cords are described in U.S. Pat. No. 4,893,665, U.S. Pat. No. 4,155,394 or U.S. Pat. No. 6,799,618.

Figure 3:
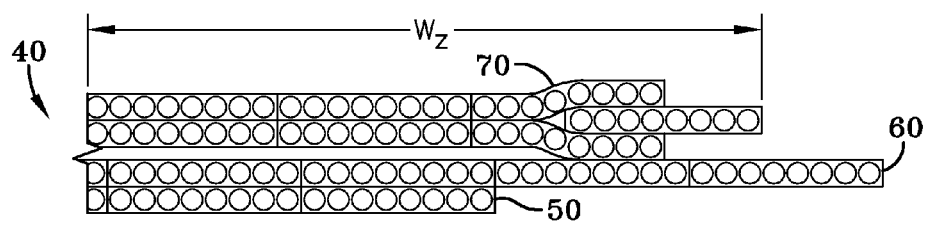
FIG. 3 is a schematically enlarged cross-sectional view of a first embodiment of half of a composite belt package for a tire showing the belt layer configuration.

The aircraft tire 10 further comprises a belt package 40 arranged between the carcass 22 and the tread rubber 20. FIG. 3 illustrates a first embodiment of one half of a belt package 40 suitable for use in the aircraft tire. The belt package 40 is symmetrical about the mid-circumferential plane so that only one half of the belt package is illustrated. The belt package 40 as shown comprises a first belt layer 50 located adjacent the carcass. The first belt layer 50 is preferably formed of cords having an angle of 5 degrees or less with respect to the mid-circumferential plane. Preferably, the first belt layer 50 is formed of a rubberized strip 43 of two or more cords made by spirally or helically winding the cords at an angle of plus or minus 5 degrees or less relative to the circumferential direction. The first belt layer 50 is the narrowest belt structure of the belt package 40, and has a width in the range of about 13% to about 100% of the rim width (width between flanges).

The belt package 40 further comprises a second belt layer 60 located radially outward of the first belt layer 50. The second belt layer 60 is preferably formed of cords having an angle of 5 degrees or less with respect to the mid-circumferential plane. Preferably, the second belt layer 60 is formed of a rubberized strip 43 of two or more cords made by spirally or helically winding the cords at an angle of plus or minus 5 degrees or less relative to the circumferential direction. The second belt layer has a width in the range of about 101% to about 120% of the rim width, and has a width greater than the first belt layer 50. More preferably, the second belt layer 60 is the widest belt layer of the belt package 40.

Figure 2:
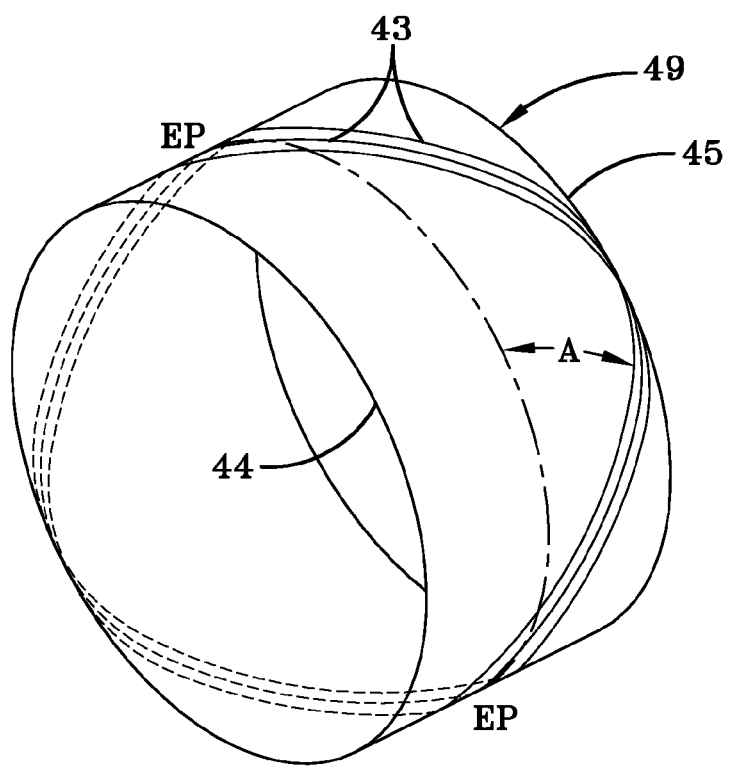
FIG. 2 is a schematic perspective view of a zigzag belt layer in the middle of the formation.

The belt package 40 further comprises at least one zigzag belt reinforcing structure 70. The zigzag belt reinforcing structure 70 is comprised of two layers of cord interwoven together formed as shown in FIG. 2. The zigzag belt structure is formed from a rubberized strip 43 of one or more cords 46, that is wound generally in the circumferential direction while being inclined to extend between alternating lateral edges 44 and 45 of a tire building drum 49 or core. The strip is wound along such zigzag path many times while the strip 43 is shifted a desired amount in the circumferential direction so as not to form a gap between the adjoining strips 43. As a result, the cords extend in the circumferential direction while changing the bending direction at a turnaround point at both ends 44, 45. The cords of the zigzag belt structure cross with each other, typically at a cord angle A of 5 degrees to 30 degrees with respect to the equatorial plane EP of the tire when the strip 43 is reciprocated at least once between both side ends 44 and 45 of the ply within every 360 degrees of the circumference as mentioned above. The two layers of cords formed in each zigzag belt structure are embedded and inseparable in the belt layer and wherein there are no cut ends at the outer lateral ends of the belt.

It is preferred that the zigzag belt structure 70 is the most radially outward belt structure of the belt package 40. It is additionally preferred that there is only one zigzag belt structure. The zigzag belt structure 70 is preferably wider than the first belt structure, and more preferably is wider than both the first belt structure but has a width less than the second belt structure 60. The ratio of the zigzag belt width Wz to the second belt structure width Ws is preferably as follows:

$$0.6 < Wz/Ws < 1.0 \qquad (1)$$

Figure 4:
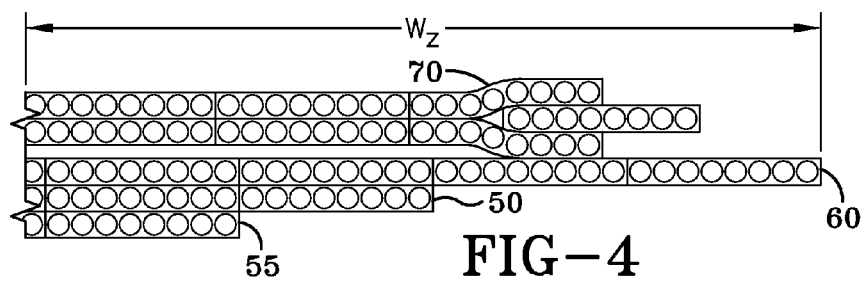
FIG. 4 is a schematically enlarged cross-sectional view of a second embodiment of a composite belt package showing the belt layer configuration.

FIG. 4 illustrates a second embodiment of the present invention. The second embodiment is the same as the first embodiment, except for the following differences. The belt package further comprises an additional third belt layer 55 located radially inward of the first belt layer 50. The third belt layer 55 preferably has a width less than the widths of all of the other belt layers 50,60,70. More preferably, the third belt layer 55 has a width in the range of about 13% to about 47% of the rim width between the flanges.

Figure 5:
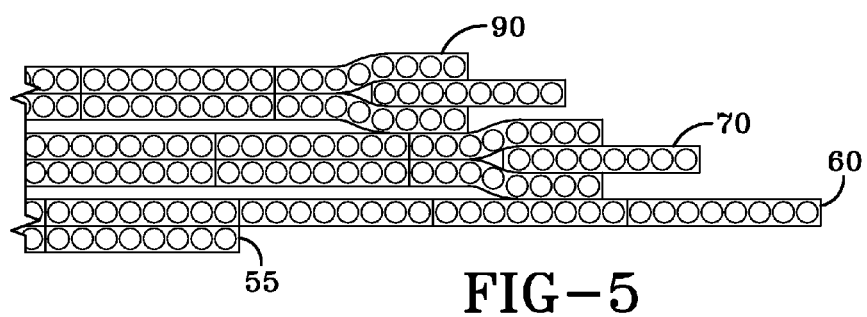
FIG. 5 is a schematically enlarged cross-sectional view of a third embodiment of a composite belt package showing the belt layer configuration.

FIG. 5 illustrates a third embodiment of the present invention. The third embodiment is the same as the second embodiment as shown in FIG. 4, except for the following differences. The first belt layer 50 has been deleted. A second zigzag belt structure 90 has been added radially outward of the first zigzag belt structure 70. The second zigzag belt structure 90 has a width less than the first zigzag belt structure 70. The zigzag belt structures 70,90 have a width less than the width of the belt layer 60.

Figure 6:
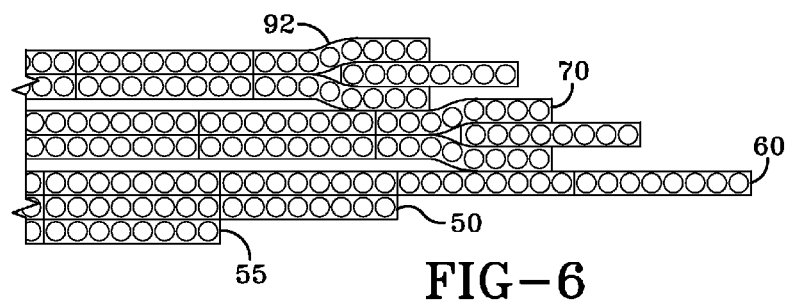
FIG. 6 is a schematically enlarged cross-sectional view of a fourth embodiment of a composite belt package showing the belt layer configuration.

FIG. 6 illustrates an additional embodiment similar to FIG. 4, except for the following differences. The belt structure 40 further includes a second zigzag belt structure 92 located radially outward of the first zigzag belt structure 70. The second zigzag belt structure 92 has a width less than the first zigzag belt structure 70. The zigzag belt structures 70,92 have a width less than the width of the belt layer 60.

Figure 7:
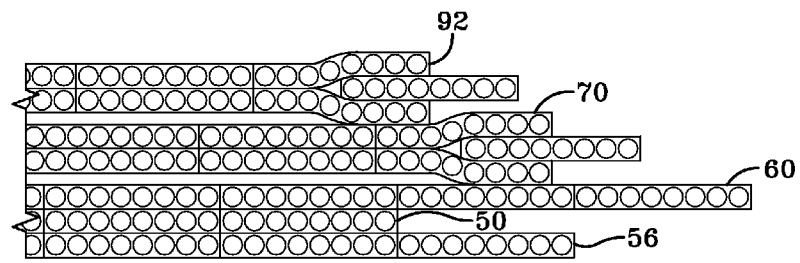
FIG. 7 is a schematically enlarged cross-sectional view of a fifth embodiment of a composite belt package showing the belt layer configuration.

FIG. 7 illustrates an additional embodiment similar to FIG. 6, except for the following differences. FIG. 7 illustrates two outer zigzag belt structures 70,92 and three low angle belt layers 60,50, 56. The belt layer 60 is the widest belt layer of the belt structure 40. The middle low angle belt layer 50 is the narrowest belt layer of the belt package 40. The radially innermost belt 56 has a width greater than the middle belt layer 50 and the radially outermost zigzag belt 92.

Figure 8:
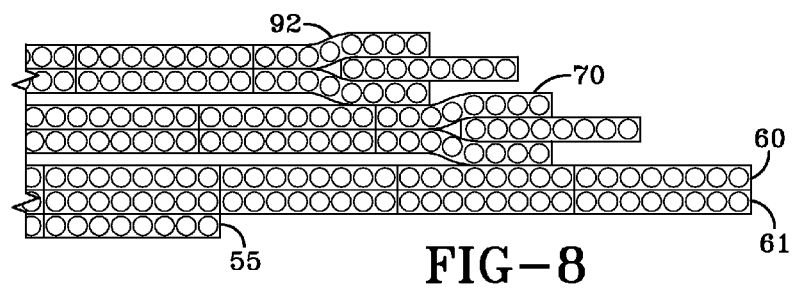
FIG. 8 is a schematically enlarged cross-sectional view of a sixth embodiment of a composite belt package showing the belt layer configuration.

FIG. 8 illustrates yet another embodiment which is similar to the embodiment shown in FIG. 6, except for the following differences. The belt package 40 includes two radially outer zigzag belts 92,70 and three low angle belts 55,60,61. Two of the low angle belts 60,61 have the same width and are the widest belts of the belt package. One of the belts 55 is located radially inward and has the narrowest width in the range of about 13% to about 47% of the rim width between the flanges.

Figure 9:
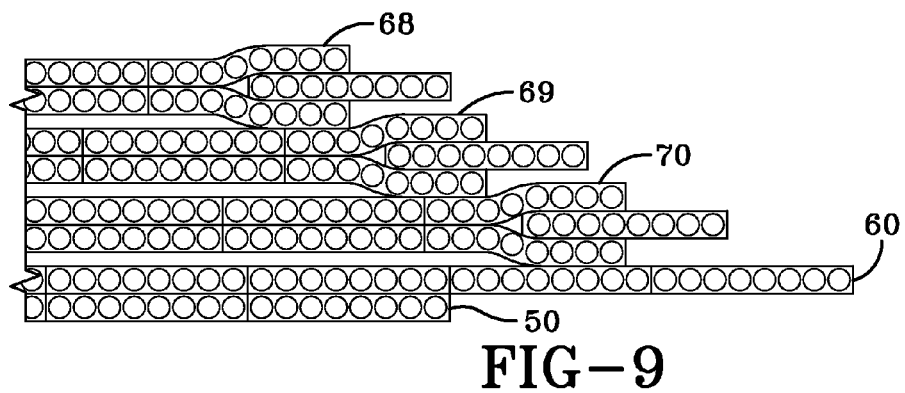
FIG. 9 is a schematically enlarged cross-sectional view of a seventh embodiment of a composite belt package showing the belt layer configuration.
Figure 10:
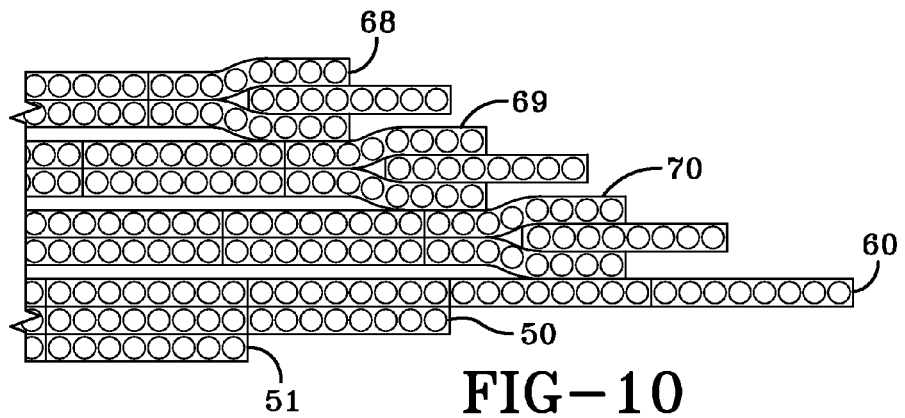
FIG. 10 is a schematically enlarged cross-sectional view of an eighth embodiment of a composite belt package showing the belt layer configuration.

FIG. 9 illustrates still another embodiment of the present invention. FIG. 9 is similar to the embodiment shown in FIG. 3, except for the following differences. The embodiment of FIG. 9 includes two radially inner low angle belts 50, 60. Low angle belt 60 is the widest belt of the belt package. The present embodiment further includes two additional zigzag belt structures 68,69 wherein both belt structures are located radially outward of the first zigzag belt structure 70. The belt structures 68,69,70 have decreasing belt widths so that the radially innermost belt is the widest belt, and the radially outermost belt is the narrowest. FIG. 10 illustrates a variation of the embodiment of FIG. 9 wherein a third low angle belt 51 is located radially inward of low angle belt 50 and has a width in the range of about 13% to about 47% of the rim width between the flanges.

In any of the above described embodiments, the cords are preferably continuously wound from one belt structure to the next.

The cords of any of the above described carcass, spiral or zigzag belt layers described above may be nylon, nylon 6,6, aramid, or combinations thereof, including merged, hybrid, high energy constructions known to those skilled in the art. One example of a suitable cord construction for the belt cords, carcass cords (or both), may comprise a composite of aramid and nylon, containing two cords of a polyamide (aramid) with construction of 3300 dtex with a 6.7 twist, and one nylon or nylon 6/6 cord having a construction of 1880 dtex, with a 4.5 twist. The overall merged cable twist is 6.7. The composite cords may have an elongation at break greater than 11% and a tensile strength greater than 900 newtons. Optionally, the original linear density may be greater than 8500 dtex. Elongation, break, linear density and tensile strength are determined from cord samples taken after being dipped but prior to vulcanization of the tire.

Variations of the present invention are possible in light of the description as provided herein. While certain representative embodiments and details have been shown for the purpose of illustrating the subject inventions, it will be apparent to those skilled in the art that various changes and modifications can be made without departing from the scope of the subject inventions.

What is claimed is:

1. A pneumatic tire having a carcass and a belt reinforcing structure, the belt reinforcing structure comprising: a first, second and third belt layers each having cords arranged at an angle of 5 degrees or less with respect to the midcircumferential plane, wherein the second belt layer is located radially inward of said first belt layer and having a width less than the first belt layer, and the third belt layer located radially inward of the second belt layer and having a width greater than the second belt layer, and a zigzag belt reinforcing structure located radially outward of the first belt layer, the zigzag belt reinforcing structure forming two layers of cords, the cords inclined at 5 to 30 degrees relative to the centerplane of the tire extending in alternation to turnaround points at each lateral edge, wherein one of the first, second and third belt layers is wider than the zigzag belt reinforcing structure.

2. The tire of claim 1 wherein the first belt layer is wider than the zigzag belt reinforcing structure.

3. The pneumatic tire of claim 1 further comprising a second zigzag belt structure located radially outward of the first belt structure, and having a width less than the first zigzag belt structure.

4. The pneumatic tire of claim 1 wherein the radial carcass ply cord fiber is nylon.

* * * * *